(12) United States Patent  (10) Patent No.: US 8,626,653 B1
Krikorian et al.  (45) Date of Patent: Jan. 7, 2014

(54) METHODS AND SYSTEMS FOR PROCESSING ELECTRONIC CROSS-BORDER PAYMENTS

(75) Inventors: Shari Krikorian, Armonk, NY (US); Margaret Rosen, Larchmont, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/592,137

(22) Filed: Aug. 22, 2012

(51) Int. Cl.
*G06Q 40/00* (2012.01)

(52) U.S. Cl.
USPC ............................................. 705/39; 705/40

(58) Field of Classification Search
USPC ..................................... 705/10–44
See application file for complete search history.

(56) References Cited

U.S. PATENT DOCUMENTS

| | | | |
|---|---|---|---|
| 5,825,003 A | 10/1998 | Jennings et al. | |
| 7,689,483 B2 | 3/2010 | Wu et al. | |
| 7,742,985 B1 * | 6/2010 | Digrigoli et al. | 705/39 |
| 7,783,537 B1 * | 8/2010 | Van Luchene et al. | 705/35 |
| 8,016,185 B2 | 9/2011 | Modi | |
| 8,032,452 B2 * | 10/2011 | Michelsen et al. | 705/39 |
| 8,055,582 B2 * | 11/2011 | Digrigoli et al. | 705/39 |
| 8,224,747 B2 * | 7/2012 | Kumar et al. | 705/39 |
| 8,249,961 B1 * | 8/2012 | Hopkins | 705/34 |
| 8,249,990 B2 * | 8/2012 | Digrigoli et al. | 705/44 |
| 8,296,232 B2 * | 10/2012 | Tullis et al. | 705/39 |
| 2002/0023053 A1 | 2/2002 | Szoc et al. | |
| 2002/0099656 A1 | 7/2002 | Poh Wong | |
| 2003/0208440 A1 | 11/2003 | Harada et al. | |
| 2005/0154674 A1 | 7/2005 | Nicholls et al. | |
| 2007/0215689 A1 * | 9/2007 | Algiene | 235/379 |
| 2009/0319421 A1 * | 12/2009 | Mathis et al. | 705/40 |
| 2010/0205065 A1 * | 8/2010 | Kumar et al. | 705/26 |
| 2010/0280949 A1 | 11/2010 | Van Rensburg | |
| 2011/0282780 A1 * | 11/2011 | French et al. | 705/39 |
| 2012/0066124 A1 | 3/2012 | Modi | |
| 2012/0066131 A1 * | 3/2012 | Modi | 705/44 |
| 2012/0296800 A1 * | 11/2012 | Tsagarakis et al. | 705/37 |
| 2012/0303529 A1 * | 11/2012 | Digrigoli et al. | 705/44 |

* cited by examiner

*Primary Examiner* — Frantzy Poinvil
(74) *Attorney, Agent, or Firm* — Armstrong Teasdale LLP

(57) ABSTRACT

Systems, methods, and computer-readable storage media are provided for processing electronic cross-border payments. The computer system is coupled to a payment network. The computer system is programmed to receive an identification of a payee, receive a destination currency and a payment amount, determine an exchange rate based on the destination currency and an origination currency, wherein the origination currency is based on a payor bank account, and determine a total transaction cost for converting the payment amount from the origination currency to the destination currency and for transmitting payment data over the payment network, wherein the total transaction cost includes the payment amount. The computer system is also programmed to transmit payment data over the payment network, wherein the transmission of payment data represents the payment amount being transferred from the payor bank account to a payee bank account. Remittance information may also be transmitted from payor to payee.

19 Claims, 16 Drawing Sheets

METHODS AND SYSTEMS FOR PROCESSING ELECTRONIC CROSS-BORDER PAYMENTS

BACKGROUND OF THE INVENTION

The field of the invention relates generally to systems and methods for processing electronic payments and, more particularly, to network-based systems and methods for processing cross-border transactions denominated in more than one currency.

A global economy requires the movement of funds across borders and across disparate currencies. International suppliers of goods and services often provide invoices to customers for payment. However, incoming payments often do not include an invoice number, requiring the supplier to manually match incoming payments to outstanding invoices, a process that can be inefficient, costly, and cumbersome.

In addition, some known payment systems do not allow the direct transfer of funds from one financial institution to another. A network of financial institutions and correspondent banks exists to forward funds from one institution to another. For example, a single payment being made from a small bank in the United States to a small bank in Germany may be passed from the small U.S. bank to a larger bank in the U.S. that serves as a correspondent bank, then to a German correspondent bank associated with the small German bank, and finally to the small German bank. This complex network is prone to delays and unpredictability. Moreover, each bank involved in the transaction may take a fee from the transferred funds. Foreign exchange rates and fees may also be applied by intermediary banks, adding more costs and unpredictability to the process.

Accordingly, a system is needed that enables cross border payments without the use of correspondent banks. Moreover, a system is needed that adds cost predictability, transaction tracking, and detailed remittance data that can be associated with each transaction to facilitate matching payments with invoices.

BRIEF DESCRIPTION OF THE INVENTION

In one embodiment, a computer system for processing electronic cross-border payments is provided. The computer system includes a memory device and a processor. The computer system is coupled to a payment network. The computer system is programmed to receive an identification of a payee, receive a destination currency and a payment amount, determine an exchange rate based on the destination currency and an origination currency, wherein the origination currency is based on a payor bank account, and determine a total transaction cost for converting the payment amount from the origination currency to the destination currency and for transmitting payment data over the payment network, wherein the total transaction cost includes the payment amount. The computer system is also programmed to transmit payment data over the payment network, wherein the transmission of payment data represents the payment amount being transferred from the payor bank account to a payee bank account, wherein the payment amount is converted from the origination currency to the destination currency according to the exchange rate.

In another embodiment, a computer-based method for processing electronic cross-border payments using a computer device coupled to a payment network is provided. The method includes receiving an identification of a payee, receiving a destination currency and a payment amount, and determining, using the computer device, an exchange rate based on the destination currency and an origination currency, wherein the origination currency is based on a payor bank account. The method also includes determining, using the computer device, a total transaction cost for converting the payment amount from the origination currency to the destination currency and for transmitting payment data over the payment network, wherein the total transaction cost includes the payment amount, and transmitting payment data over the payment network, wherein the transmission of payment data represents the payment amount being transferred from the payor bank account to a payee bank account, wherein the payment amount is converted from the origination currency to the destination currency according to the exchange rate.

In yet another embodiment, at least one non-transitory computer-readable storage media having computer-executable instructions embodied thereon is provided. When executed by at least one processor, the computer-executable instructions cause the processor to receive an identification of a payee, receive a destination currency and a payment amount, determine an exchange rate based on the destination currency and an origination currency, wherein the origination currency is based on a payor bank account, and determine a total transaction cost for converting the payment amount from the origination currency to the destination currency and for transmitting payment data over the payment network, wherein the total transaction cost includes the payment amount. The computer-executable instructions also cause the processor to transmit payment data over the payment network, wherein the transmission of payment data represents the payment amount being transferred from the payor bank account to a payee bank account, wherein the payment amount is converted from the origination currency to the destination currency according to the exchange rate.

DETAILED DESCRIPTION OF THE INVENTION

Figure 1:
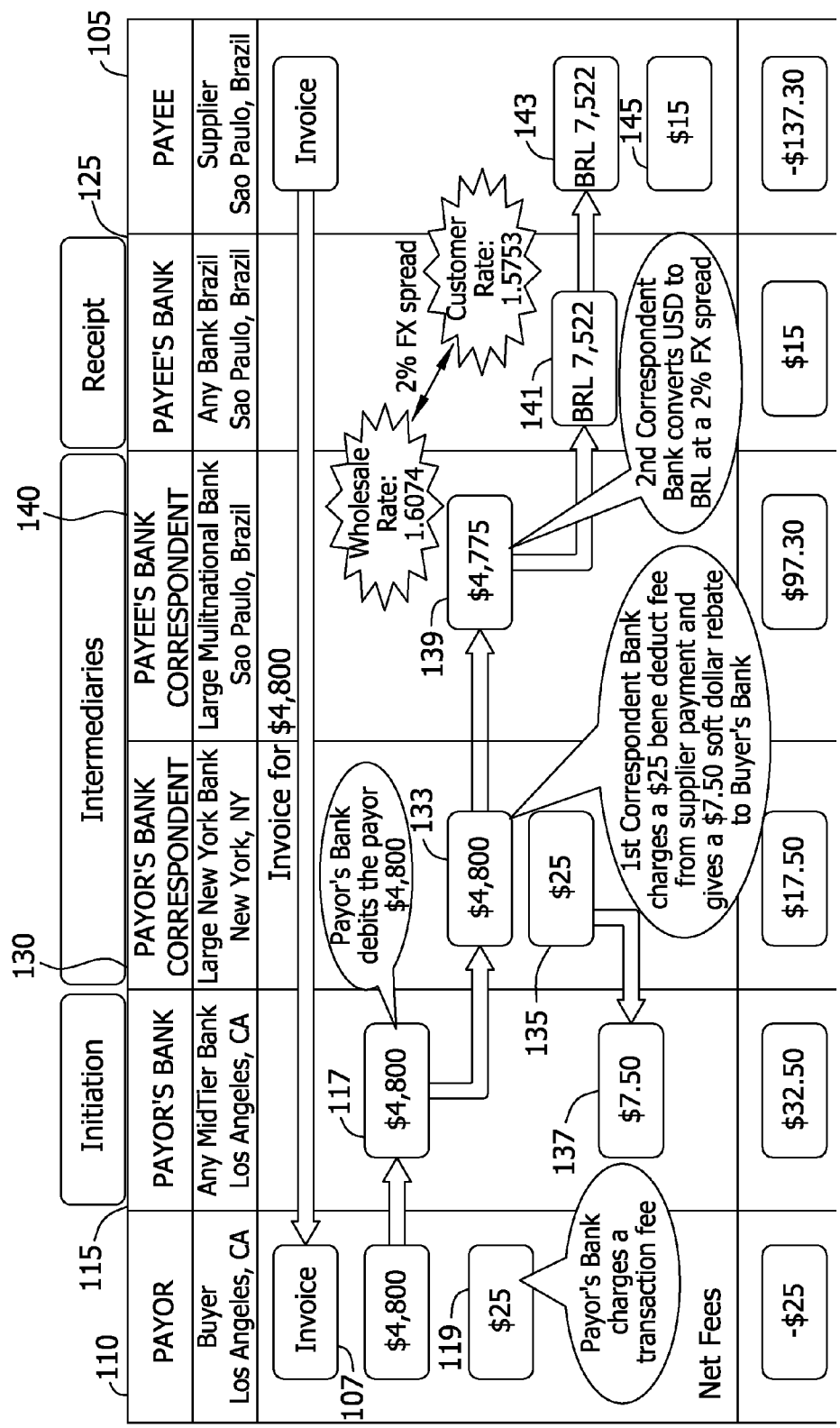
FIG. 1 is a diagram showing a conventional payment system.

The present disclosure is directed to processing an electronic payment across national borders and, when applicable, using more than one currency. The process may begin with an enrollment step in which a payee, or biller, enrolls with a payment system. By so doing, a list or directory of payees is created. A payee sends an invoice to a customer, or payor. The invoice requests payment for a certain amount in a specified currency. The payor initiates a payment to the payee by using the payment system to identify the payee from the list of payees. Alternatively, the payor provides information about the payee, such as where the payment should be directed. The payor further identifies a payment amount, a payment currency, and remittance information. Remittance information may include a reference to the invoice, text, data, files, etc. The payment system determines an exchange rate for the transaction based on current rates. The total cost of the transaction, including the payment amount, foreign exchange fees, transaction fees, and any other costs or fees, are determined and presented to the payor in the currency of the payor's bank account. The payment system transfers money from the payor's bank account to the payee's bank account using a payment network. Remittance information is transmitted to the payee, either with the payment or separately. The payment system tracks the progress of the transaction and makes the status available to the payor and payee. FIGS. 2-5 are used to illustrate the hardware involved in completing these steps.

A technical effect of the systems and processes described herein includes at least one of: (a) enrolling a payee with a payment system; (b) initiating, using the payment system, a payment; (c) receiving, at the payment system, an identification of a payee; (d) receiving, at the payment system, a currency and payment amount; (e) receiving, at the payment system, remittance information; (f) determining an exchange rate based on the received currency; (g) applying the exchange rate and providing a converted currency amount; (h) transferring, using the payment system, money from a payor bank account to a payee bank account; (i) delivering remittance information to the payee; (j) tracking the status of the transaction; and (k) providing the status to the payor and/or payee.

In one embodiment, a computer program is provided, and the program is embodied on a computer readable medium. In an exemplary embodiment, the system is web enabled and is accessible to authorized users through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer readable medium.

The systems and processes are not limited to the specific embodiments described herein. In addition, components of each system and each process can be practiced independent and separate from other components and processes described herein. Each component and process also can be used in combination with other assembly packages and processes.

Embodiments described herein access data stored in one or more data sources or databases. The terms data source and database are used interchangeably herein. A data source may include, but is not limited to: database server software (e.g., ORACLE DATABASE, MICROSOFT SQL SERVER) executing on one or more computing devices; one or more structured files; one or more text files; binary data in one or more files; one or more serialized objects; and/or one or more data lookup services, such as a web service.

The following detailed description illustrates embodiments of the invention by way of example and not by way of limitation. It is contemplated that the invention has general application to processing financial transaction data by a third party in industrial, commercial, and residential applications. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

FIG. 1 is a diagram illustrating a conventional system 100 for making cross-border payments. Conventionally, a payee 105 transmits an invoice 107 to a payor 110 using known methods. Payor 110 transmits a payment to payee 105 using system 100, which includes a network of banks, explained in more detail herein.

In the example illustrated in FIG. 1, invoice 107 is for US$4,800. The amounts used herein are merely illustrative of a possible transaction, and other amounts, currencies, fees, and rates may be possible. Payor 110 initiates payment using a payor's bank 115. An amount 117 of US$4,800 is debited from an account of payor 110 at payor's bank 115. Payor's bank 115 charges payor 110 a fee 119 of US$25 for transmitting the payment. In the example of FIG. 1, payee 105 does not have an account at payor's bank 115. Payee 105 has an account at payee's bank 125, which is located in a different country than payor's bank 115. Moreover, payor's bank 115 is not associated with payee's bank 125 via a payment network, and therefore cannot directly transfer funds to payee's bank 125. Rather, payor's bank 115 uses a network that includes correspondent banks for forwarding the payment to the payee's bank 125.

Payor's bank 115 has a relationship with a payor's bank correspondent 130 that is located in the same country as payor's bank 115. Payor's bank 115 transfers a payment 133 of US$4,800 to payor's bank correspondent 130. Payor's bank correspondent 130 deducts a bene deduct fee 135 of US$25 from payment 133 and gives a soft dollar rebate 137 of US$7.50 to payor's bank 115. Payment 133 may be transferred from payor's bank 115 to payor's bank correspondent using a domestic payment network (not shown), such as Fedwire provided by the United States Federal Reserve Banks and/or the Automated Clearing House (ACH) network.

Payor's bank correspondent 130 transfers a payment 139 to a payee's bank correspondent 140. Payor's bank correspondent 130 and payee's bank correspondent 140 are associated via a payment network (not shown), such as SWIFTNet provided by the Society for Worldwide Interbank Financial Telecommunication. Notably, SWIFTNet does not provide funds transfer, and so payment 139 from payor's bank correspondent 130 is effectuated using a correspondent account with payee's bank correspondent 140 in response to payment information sent via SWIFTNet.

Payee's bank correspondent 140 converts payment 139, denominated in US Dollars, to Brazilian real (BRL) and transfers a payment 141, denominated in BRL or R$, to payee's bank 125. The currency exchange is performed with a 2% spread, which produces an FX fee for payee's bank correspondent 140.

Finally, payee's bank 125 credits the account associated with payee 105 an amount 143 of R$7,522. Payee's bank 125 additionally charges payee 105 a transaction fee 145 equivalent to US$15. After the deduction of fees for funds transfers and currency exchange, amount 143 is US$137.30 less than invoice 107.

While only two correspondent banks (130 and 140) are shown in FIG. 1, additional correspondent banks may be used to transfer cross-border payments. As illustrated in FIG. 1, conventional system 100 causes multiple fees to be incurred, reducing the final payment amount by an unpredictable amount.

Figure 2A:
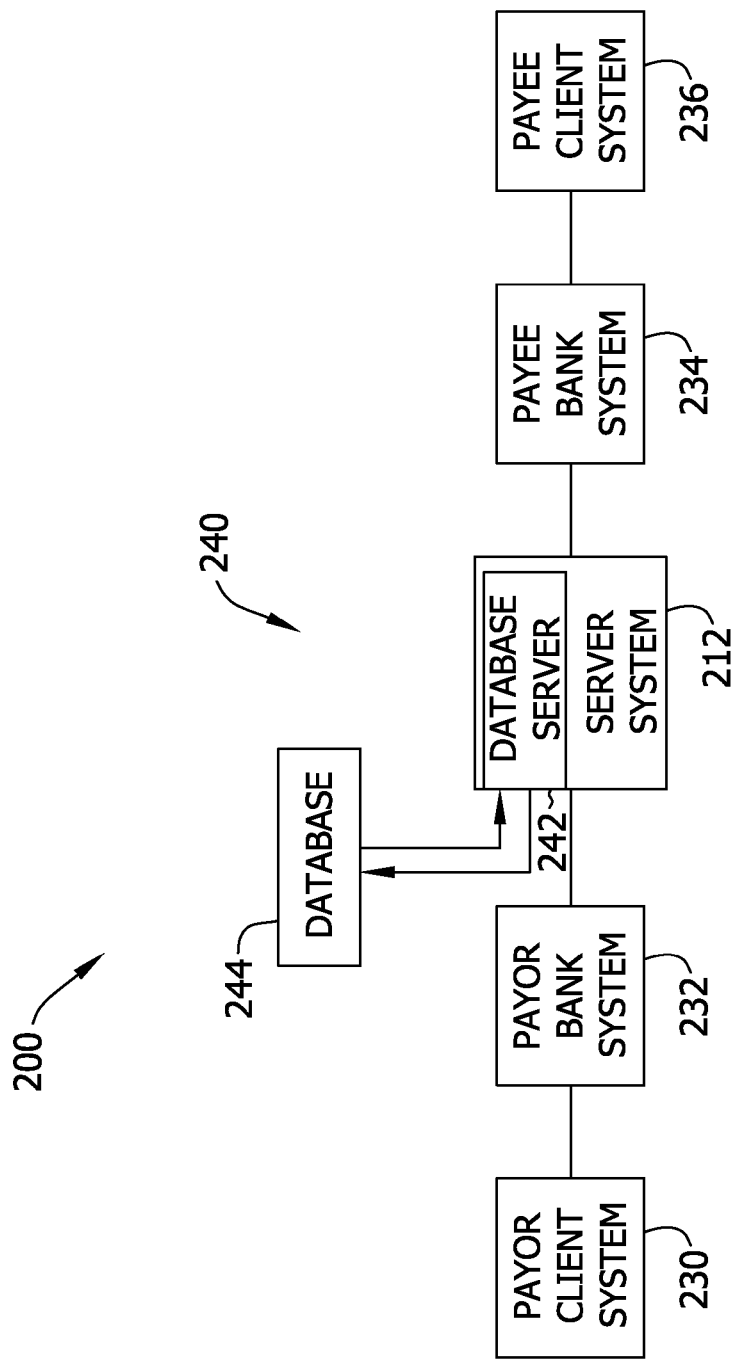
FIG. 2A is a simplified block diagram of an exemplary embodiment of a server architecture of a payment system in accordance with one embodiment of the present invention.

FIG. 2A is a simplified block diagram of an exemplary payment system 200 in accordance with one embodiment of the present invention. More specifically, in the exemplary embodiment, payment system 200 includes a server system 212, and a plurality of sub-systems, also referred to as client systems 230, 232, 234, and 236 connected to and/or in communication with server system 212. In the exemplary embodiment, server system 212 is also referred to as a central payment processor that processes electronically submitted payment transactions submitted by a consumer after a bill is presented over the system or using other means to the consumer by a biller.

Payees, or billers or suppliers, utilizing payment system 200 for processing bills for payment are enrolled within payment system 200. By enrolling in payment system 200, payors, or customers or buyers, are able to submit payments to payees using payment system 200. When processing a payment from a payor, payment system 200 may first verify that the payee identified by the payor is enrolled within payment system 200.

In the exemplary embodiment, client system 230 is associated with a payor, and therefore is referred to as payor system 230 or payor 230. Client system 232 is associated with a payor bank, or a bank with which payor 230 has a relationship, and therefore is referred to as payor bank system 232 or payor bank 232. Client system 236 is associated with a payee, and therefore is referred to as payee system 236 or payee 236. Client system 234 is associated with a payee bank, or a bank with which payee has a relationship, and therefore is referred to as payee bank system 234 or payee bank 234.

In the exemplary embodiment, server system 212 is communicatively coupled, e.g., networked via WAN, ISDN, frame relay, the Internet, etc., with payor bank system 232 and payee bank system 234 to form a payment network 240. Payment network 240, as described in more detail herein, enables the transfer of money in the form of payments, and of data associated with the payments from a first endpoint, e.g., payor 232, of payment network 240 to a second endpoint, e.g., payee 236, of payment network 240. Payment network 240 includes a variety of systems (not all shown), including systems 232 and 234, capable of sending and receiving payments using payment network 240. The component systems of payment network 240 are generally associated with banking institutions located in two or more countries. Accordingly, as described in more detail herein, payment network 240 enables cross-border payments between and among its constituent banking institutions.

In one embodiment, client systems 230 and 236 are computers including a web browser, such that client system 232, client system 234, and server system 212 are accessible to client systems 230 and 236 using the Internet. Client systems 230 and 236 are interconnected to the Internet through many interfaces including a network, such as a local area network (LAN) or a wide area network (WAN), dial-in-connections, cable modems, and special high-speed ISDN lines. Client systems 230 and 236 could be any device capable of interconnecting to the Internet including a web-based phone, personal digital assistant (PDA), or other web-based connectable equipment. A database server 242 is connected to a database 244 containing information on a variety of matters including payment data and payee data, which is described below in detail. In an alternative embodiment, database 244 is stored remotely from server system 212 and may be non-centralized.

Figure 2B:
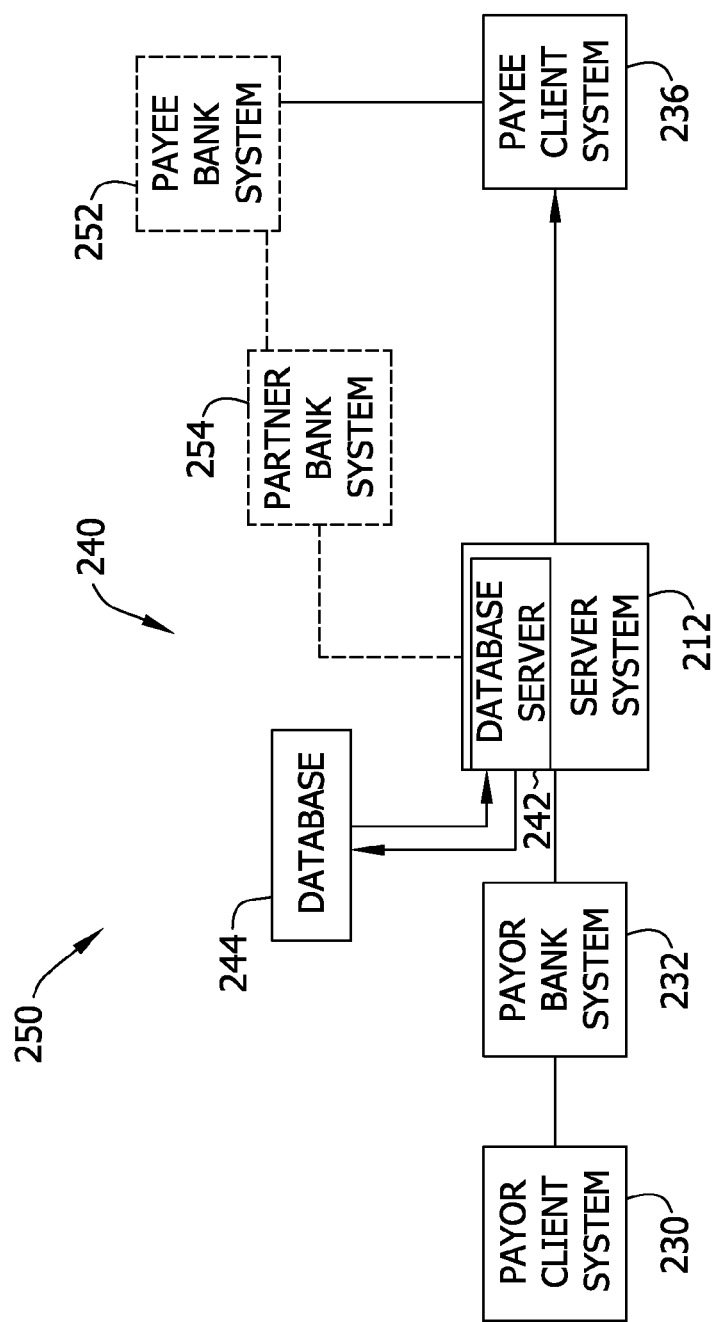
FIG. 2B is a simplified block diagram of an alternative embodiment of the payment system shown in FIG. 2A.

FIG. 2B illustrates an alternative payment system 250 that is similar to system 200 (shown in FIG. 2A). In the alternative embodiment shown in FIG. 2B, payee 236 is associated with a payee bank 252 that is not associated with server system 212 and/or network 240. In such case, payee bank 252 may be associated with a partner bank 254 that is associated with server system 212 and/or network 240. Payee bank 252 and partner bank 254 have features and components similar to payor bank system 232 and payee bank system 234.

Figure 3:
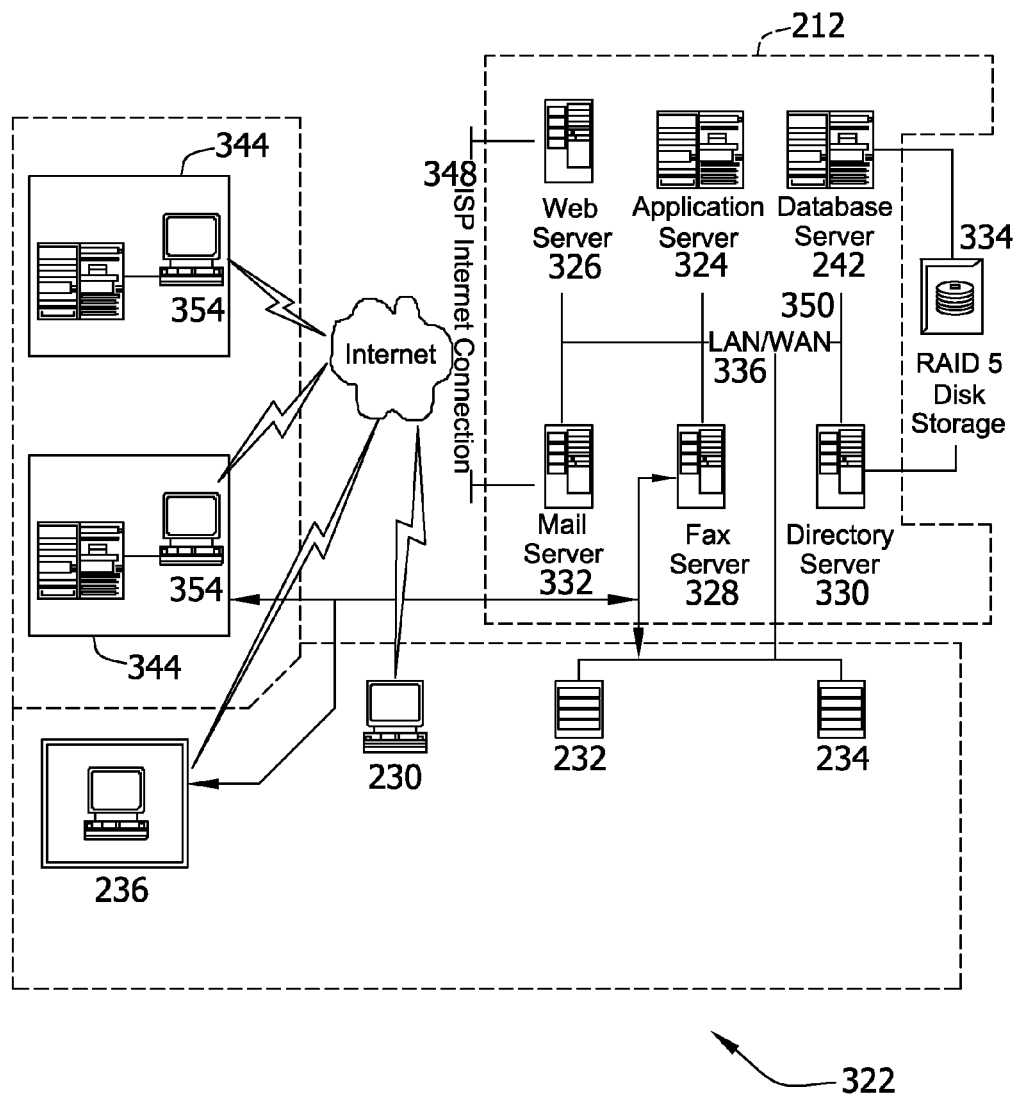
FIG. 3 is an expanded block diagram of an exemplary embodiment of a server architecture of a payment system in accordance with one embodiment of the present invention.

FIG. 3 is an expanded block diagram of an exemplary embodiment of a server architecture of a payment system 322 in accordance with one embodiment of the present invention. Components in system 322, identical to components of system 200 (shown in FIG. 2A), are identified in FIG. 3 using the same reference numerals as used in FIG. 2A. System 322 includes server system 212 and client systems 230, 232, 234, and 236. Server system 212 further includes database server 242, an application server 324, a web server 326, a fax server 328, a directory server 330, and a mail server 332. A disk storage unit 334 is coupled to database server 242 and directory server 330. Servers 242, 324, 326, 328, 330, and 332 are coupled in a local area network (LAN) 336. Client systems 232 and 234 are coupled to LAN 336. Alternatively, client systems 232 and 234 are coupled to LAN 336 using an Internet link or are connected through an intranet or other suitable link or network.

Each system 230 and 236 is a personal computer having a web browser. Although the functions performed at the workstations typically are illustrated as being performed at respective workstations 230 and 236, such functions can be performed at one of many personal computers coupled, directly or indirectly, to LAN 236. Workstations 230 and 236 are illustrated as being associated with separate functions only to facilitate an understanding of the different types of functions that can be performed by individuals having access to LAN 236.

Server system 212 is configured to be communicatively coupled to various individuals, including employees 344, and to third parties, e.g., billers, sellers, biller service providers, consumer service providers, payees 230, payors 236, etc. using an Internet connection 348. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 350, local area network 336 could be used in place of WAN 350.

In the exemplary embodiment, any authorized individual having a workstation 354 can access system 322. Workstations 354 are personal computers having a web browser and are configured to communicate with server system 212. Furthermore, fax server 328 communicates with remotely located client systems using a telephone link. Fax server 328 is configured to communicate with other client systems 232 and 234 as well.

As used herein, the terms "software" and "firmware" are interchangeable, and include any computer program stored in memory for execution by personal computers, workstations, clients and servers, including random access memory (RAM), read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Figure 4:
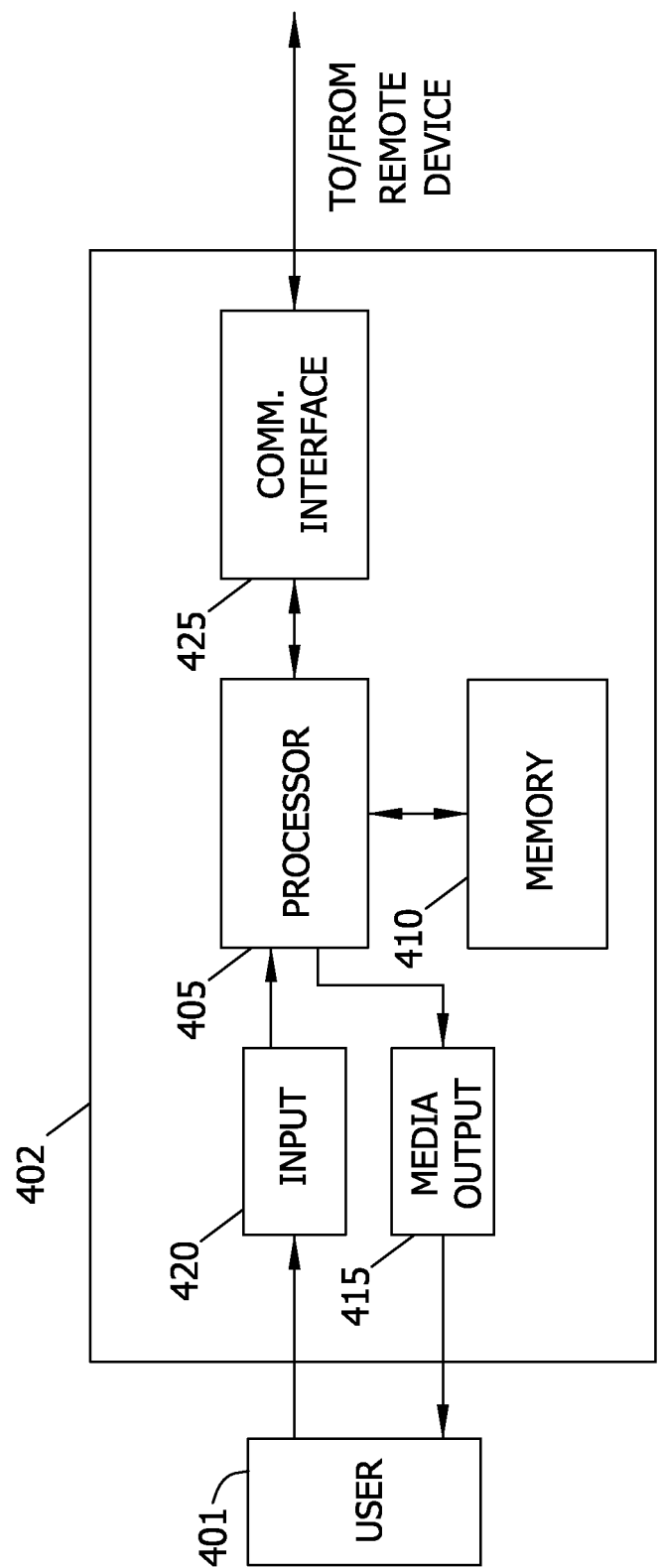
FIG. 4 illustrates an exemplary configuration of a client system shown in FIGS. 2A, 2B, and 3.

FIG. 4 illustrates an exemplary configuration of a user computing device 402 operated by a user 401. User computing device 402 may include, but is not limited to, client systems 230 and 236 and workstation 354.

User computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or written works to be stored and retrieved. Memory area 410 may include one or more computer readable media.

User computing device 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

User computing device 402 may also include a communication interface 425, which is communicatively couplable to a remote device such as server system 212. Communication interface 425 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 410 are, for example, computer readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from server system 212. A client application allows user 401 to interact with a server application from server system 212.

Figure 5:
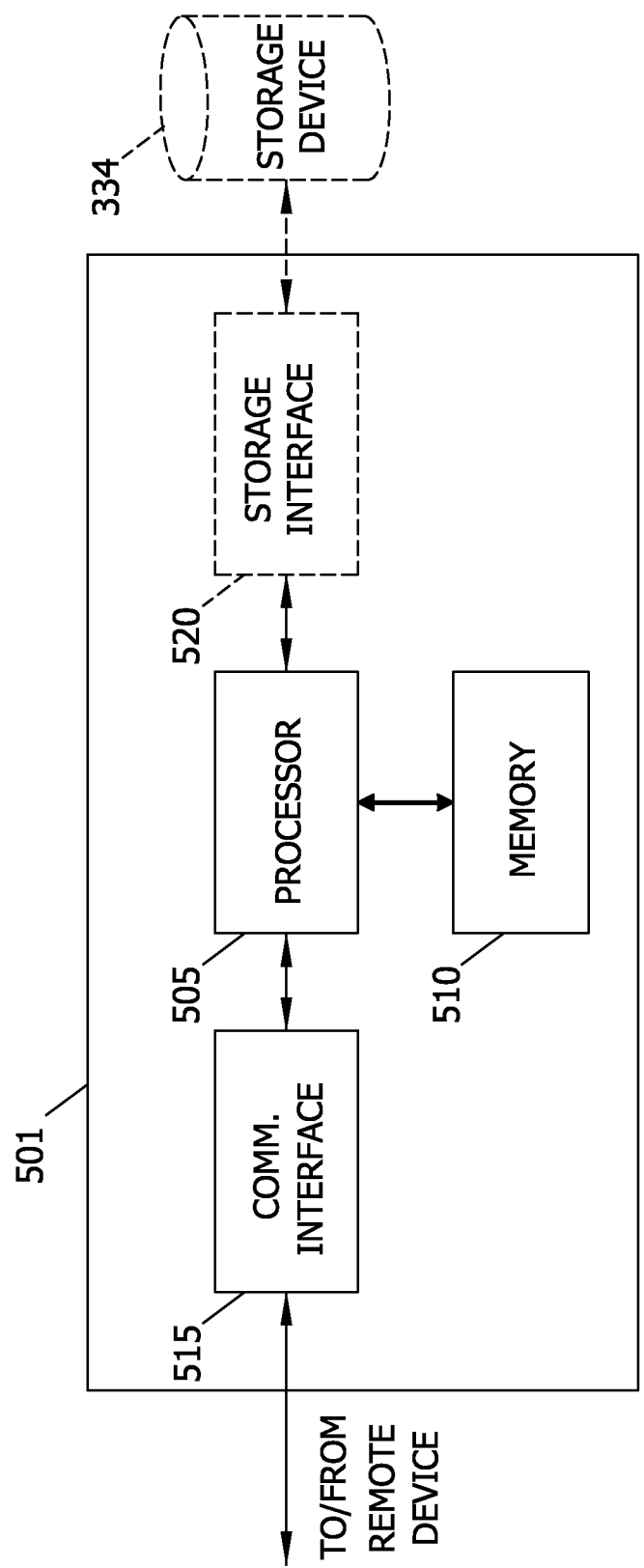
FIG. 5 illustrates an exemplary configuration of a server system shown in FIGS. 2A, 2B, and 3.

FIG. 5 illustrates an exemplary configuration of a server computing device 501 such as server system 212 (shown in FIG. 2 and also referred to as central payment processor). Server computing device 501 may include, but is not limited to, database server 242, application server 324, web server 326, fax server 328, directory server 330, mail server 332, payor bank 232, and payee bank 234.

Server computing device 501 also includes a processor 505 for executing instructions. Instructions may be stored in a memory area 510, for example. Processor 505 may include one or more processing units (e.g., in a multi-core configuration).

Processor 505 is operatively coupled to a communication interface 515 such that server computing device 501 is capable of communicating with a remote device such as user computing device 402 or another server computing device 501. For example, communication interface 515 may receive requests from any one of user computing devices 230, 232, 234, 236 via the Internet, LAN 336, and/or WAN 350, as illustrated in FIG. 3.

Processor 505 may also be operatively coupled to a storage device 334. Storage device 334 is any computer-operated hardware suitable for storing and/or retrieving data. In some embodiments, storage device 334 is integrated in server computing device 501. For example, server computing device 501 may include one or more hard disk drives as storage device 334. In other embodiments, storage device 334 is external to server computing device 501 and may be accessed by a plurality of server computing devices 501. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 505 is operatively coupled to storage device 334 via a storage interface 520. Storage interface 520 is any component capable of providing processor 505 with access to storage device 334. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 334.

Figure 6:
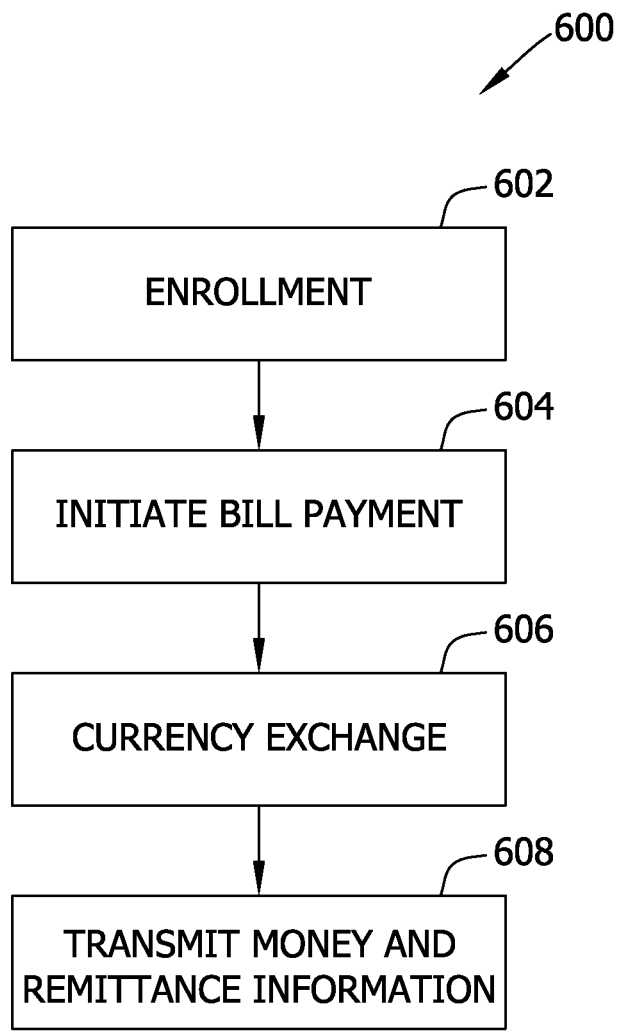
FIG. 6 is a flowchart illustrating an exemplary method of processing an electronic payment by the payment system shown in FIGS. 2A, 2B, and 3.

FIG. 6 is a flowchart illustrating an exemplary method 600 of processing an electronic payment by payment system 200 (shown in FIG. 2). Referring to FIGS. 2 and 6, payment system 200 achieves the technical effect by implementing method 600 which includes an enrollment step 602 wherein a payee 236 enrolls in a payment processing service provided by the payment network (shown in FIG. 2) through server system 212. After enrollment 602, payor 230 makes a bill payment step 604 that involves payor 230 paying a bill generated from payee 236 for services or goods provided by payee 236 to payor 230. Money to be paid by payor 230 is converted to the currency requested by payee 236 in a currency exchange step 606 if a conversion is required. Money and payment information are delivered 608 to payee 236.

Figure 7:
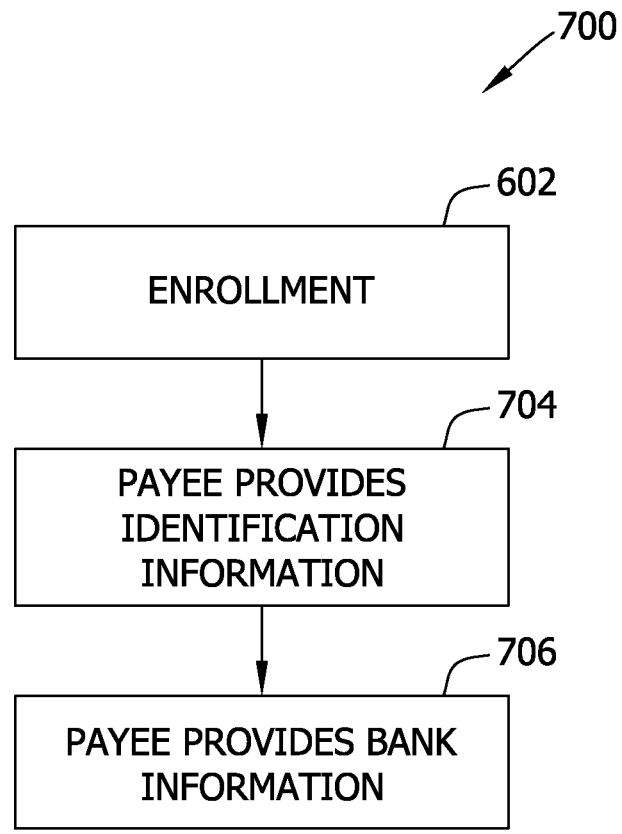
FIG. 7 is a more detailed flowchart illustrating an exemplary method of enrollment within the payment system shown in FIGS. 2A, 2B, and 3.

FIG. 7 is a more detailed flowchart illustrating an exemplary method 700 of enrollment step 602 (shown in FIG. 6). In an exemplary embodiment, payee 236 enrolls in a payment service offered by payment network 240 through server system/central payment processor 212. The payment service enables payee 236 to receive electronic payments from payors who are users of network 240.

Enrollment of payees facilitates the efficient function of payment system 212. Specifically, enrollment of payees enables a payor to select a payee from a pre-determined list or directory of payees. Enrolling payees facilitates greater accuracy in payment transactions by allowing payors to select a payee from a list rather than inputting payee information. However, payors may alternatively provide payee information rather than selecting a payee from a list, as described herein.

Payee enrollment includes a step 704 wherein a payee, e.g., payee 236, provides identification information to system 212. For example, the payee may use a web interface to interact with system 212 and provide a name and contact information. The identification information provided by payees may be used in the directory of payees from which payors select payees. The payee also provides 706 bank information, such as a bank name, an account number, and/or bank routing information. Bank information may be used by system 212 to transfer money to an account associated with payee 236.

Payee information provided during enrollment 602 may be stored in a database, e.g., database 244. It should be appreciated that payee enrollment may only be required once for each payee and that a payee does not need to complete enrollment step 602 for each payment transaction.

Figure 8:
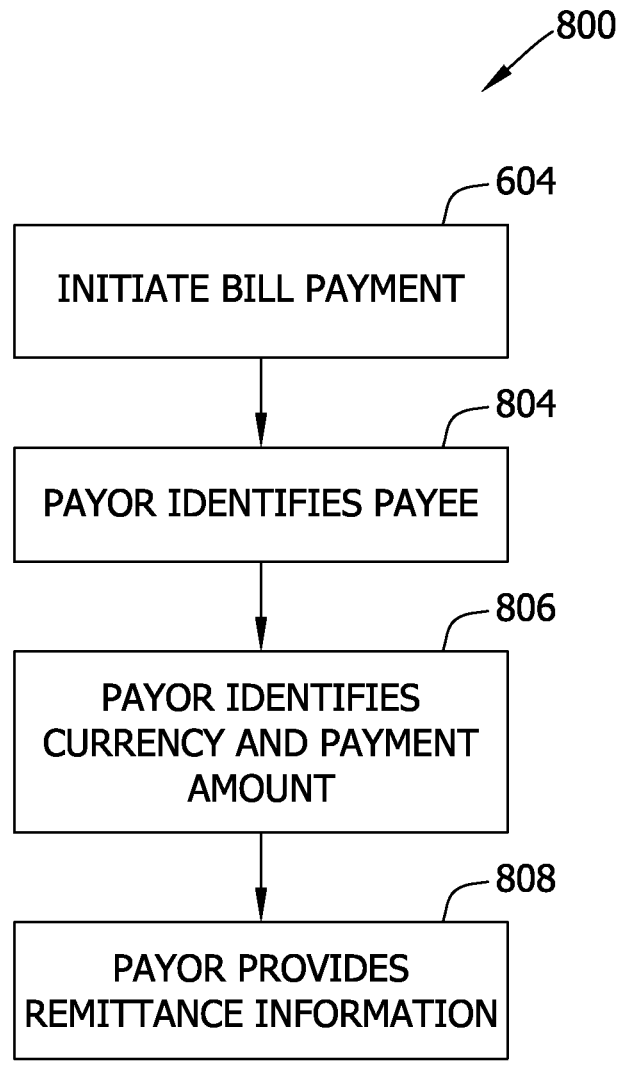
FIG. 8 is a more detailed flowchart illustrating an exemplary method of payment initiation using the payment system shown in FIGS. 2A, 2B, and 3.

FIG. 8 is a more detailed flowchart illustrating an exemplary method 800 of payment initiation step 604 (shown in FIG. 6). Payees, which may be suppliers of goods and services to payors, including payor 230, may provide an invoice to the payor. In response, the payor may initiate 604 an electronic payment to the payee, sometimes referred to as a biller.

A payor may use payment system 212 to send the electronic payment to the payee. The payor may interact directly with payment system 212 using a web interface. Alternatively, the payor may interact with payor's bank, e.g., payor bank system 232 using a web interface. Payor bank system 232 may provide an interface, e.g., via APIs, to payment system 212. The steps of identifying and providing, in method 800, include identifying and providing data or input to payment system 212, whether directly or indirectly (i.e., via payor bank 232).

The payor is an authorized user of payment system 212. The payor, prior to sending payments via system 212, established a payor bank account from which system 212 may deduct the necessary funds to complete the requested transaction. For example, the payor may have a demand deposit account or credit line at payor bank 232.

Initially, the payor identifies 804 an intended payee. The payor may select the intended payee from a list of enrolled payees or the payor may input payee information, including payee identification and payee bank information. System 212 may verify the validity of the payee selected or input by the payor. For example, system 212 may verify that the payee bank information is complete.

The payor identifies 806 the currency for the transaction and the payment amount. The currency type and payment amount may be found on the invoice provided by the payee to the payor. The payor identifies the payment amount in the transaction currency, which may be different than the currency of the payor bank account.

The payor may identify 808 remittance information associated with the electronic payment. Remittance information may include an invoice number, an order number, a purchase request number, notes, attachments, electronic files, and/or any text or data associated with the invoice and/or the electronic payment. For example, remittance information may include an invoice number and a note that only partial payment is being made because some products included in the invoice were damaged. Remittance information is provided by the payor and is transmitted, as explained herein, to the payee. Accordingly, remittance information may be used by the payee to identify the invoice associated with an incoming electronic payment.

Figure 9:
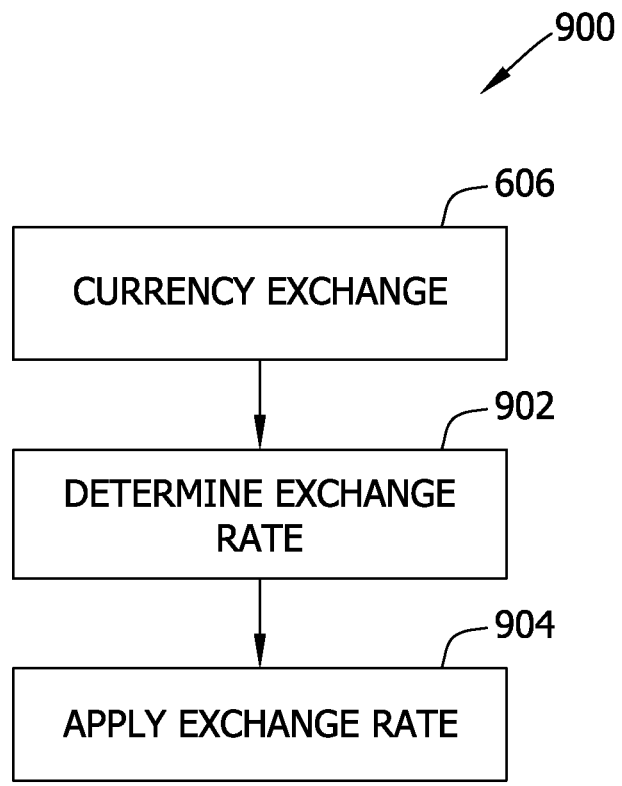
FIG. 9 is a more detailed flowchart illustrating an exemplary method of currency exchange using the payment system shown in FIGS. 2A, 2B, and 3.

FIG. 9 is a more detailed flowchart illustrating an exemplary method 900 of currency exchange step 606 (shown in FIG. 6). As the payor bank account may be denominated in a currency that is different than the currency of the transaction and/or the currency of the payee bank account, a currency exchange step 606 may be required. Currency exchange 606 is provided by system 212 and/or the operator of network 240.

A current exchange rate is determined 902 for the appropriate currency conversion. The current exchange rate may be based on a daily rate, an hourly rate, an instantaneous rate, or any other exchange rate. The determined exchange rate is applied 904 to the payment amount to determine the equivalent value in the originating currency (i.e., the currency of the payor bank account). The equivalent value, together with the current exchange rate and/or any currency exchange fees, may be presented to the payor for approval. For example, the currency exchange information may be presented to the user via a web interface. If approved, the transaction continues in the approved new currency. Otherwise, the transaction is aborted. Accordingly, a payor may know all fees and costs associated with the electronic payment before conducting the transaction.

Figure 10:
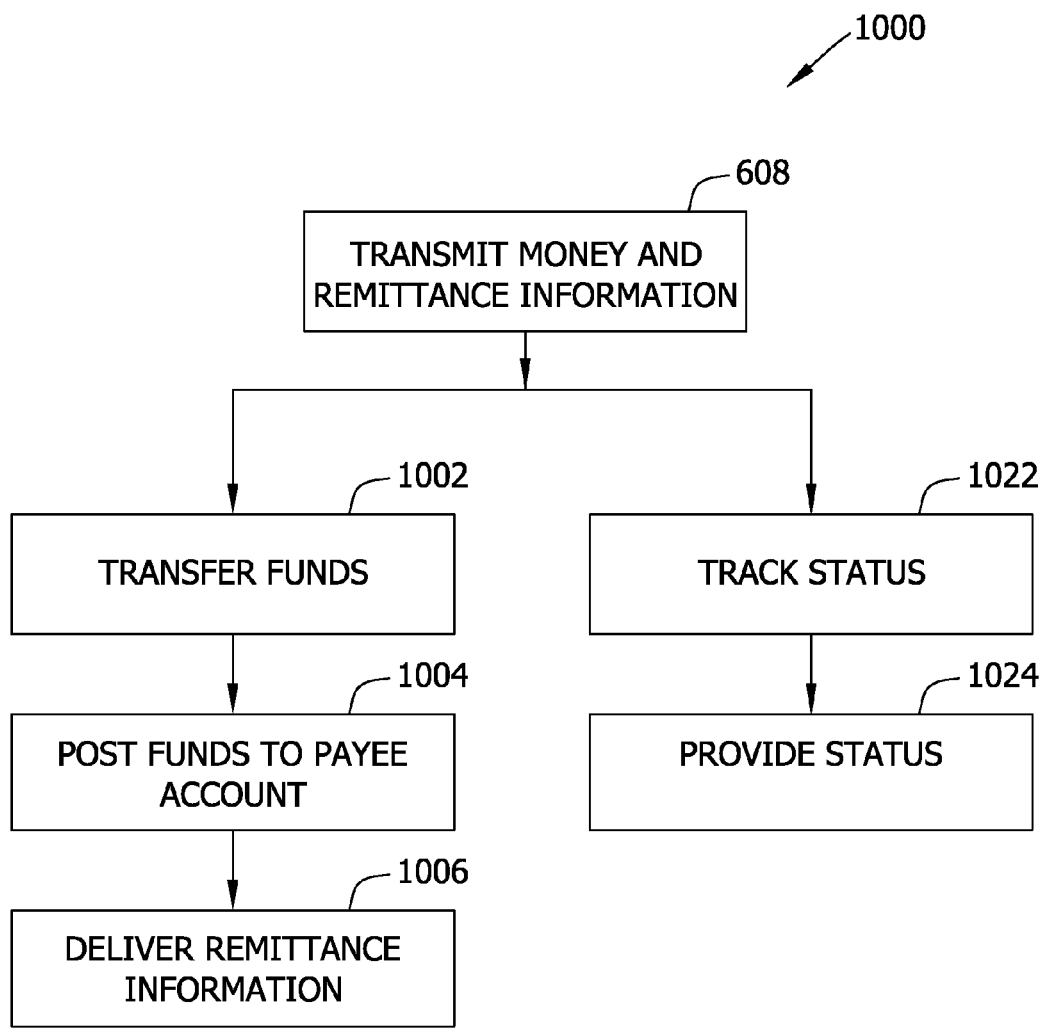
FIG. 10 is a more detailed flowchart illustrating an exemplary method of money and remittance information transmission using the payment system in FIGS. 2A, 2B, and 3.

FIG. 10 is a more detailed flowchart illustrating an exemplary method 1000 of money and remittance information transmission step 608 (shown in FIG. 6). Step 608 includes the steps of transferring the money 1002, posting the money to the payee bank account 1004, and delivering remittance information 1006.

In the exemplary embodiment, transferring 1002 the money includes debiting the payor bank account. If the payor is using the payor's bank to send the electronic payment, the payor's bank may debit the payor bank account and confirm a successful withdrawal (i.e., if sufficient funds are available) to payment system 212 and/or a payment network, e.g., payment network 240. Money transfers to, within, and from the payment network may be accomplished using a settlement account. For example, each financial institution associated with the payment network may have a settlement account. A transfer of money from a first bank to a second bank using the payment network may be accomplished by debiting the settlement account of the first bank a pre-determined amount and crediting the second bank the pre-determined amount. In the exemplary embodiment, the payor's bank uses a settlement account to transfer funds to the payment network.

Moreover, transferring 1002 the money includes a clearing and a settlement process. Initially, clearing data is sent to the payee's bank, usually in near real-time. Subsequently, settlement data is sent to the payee's bank, e.g., in nightly batches, and the money is debited and credited from appropriate accounts through a net settlement process. This entire process of transferring 1002 money is faster and more efficient than conventional cross-border payment systems (as shown in FIG. 1), which have multiple "hops" for data and/or money via a plurality of banks and/or disparate payment networks.

If the payor is using payment system 212 directly to send the electronic payment, payment system 212 may initiate a drawdown debit, ACH payment, wire transfer, or other transfer of funds from payor bank account to payment system 212 and/or payment network 240. Regardless of how the payor's funds are held, the money for the electronic payment, plus any transaction fees, will be deducted from the payor bank account and transferred to the payment network for forwarding to the payee.

In some cases, the payee's bank is not directly associated with the payment network, such as payee bank 252. In such cases, funds are transferred from the payment network to partner bank 254 for forwarding to payee bank 252. As partner bank 254 is associated with the payment network, funds may be transferred from the payment network to partner bank 254 in the same manner than funds are transferred from the payment network to payee bank 236. Partner bank 254 may transfer funds to payee bank 252 using a local (i.e., intra-nation, and/or intra-region) funds transfer methodology, such as a wire or ACH transfer.

Remittance information may be delivered 1006 from payment system 212 to the payee together with the fund transfer. For example, the fund transfer methodology may allow data to be transmitted with the fund transfer. Alternatively, remittance information may be delivered using server system 212 and/or payee bank system 234/252. More specifically, payee may retrieve remittance information from server system 212, whether directly or via a "white-label" interface, using a web interface.

Step 608 also includes tracking 1022 the status of the electronic payment and providing 1024 the current status. System 212 monitors and records each step in the electronic payment process, from payment initiation 604 through money transmission 608 in order to track 1022 the progress of the transaction. The payor and payee may visit a website provided by server system 212, payor bank 232, and/or payee bank 234 to receive the status provided 1024 by server system 212. Providing the current status of the transaction helps the payee and the payor to know where the money is at each stage of the transaction. Alternatively, or additionally, the status may be provided 1024 by sending alerts or notifications, such as emails, text messages, on-screen alerts, etc., to the payor and/or the payee indicating that additional steps have been taken, problems have been encountered, the money is being delayed, the money is available, remittance information is available, and the like. In addition, the payor and the payee may use server system 212 to communicate with each other about the electronic payment. Communications between the payor and the payee may be associated with the electronic payment, similar to comments on a blog post.

Figure 11:
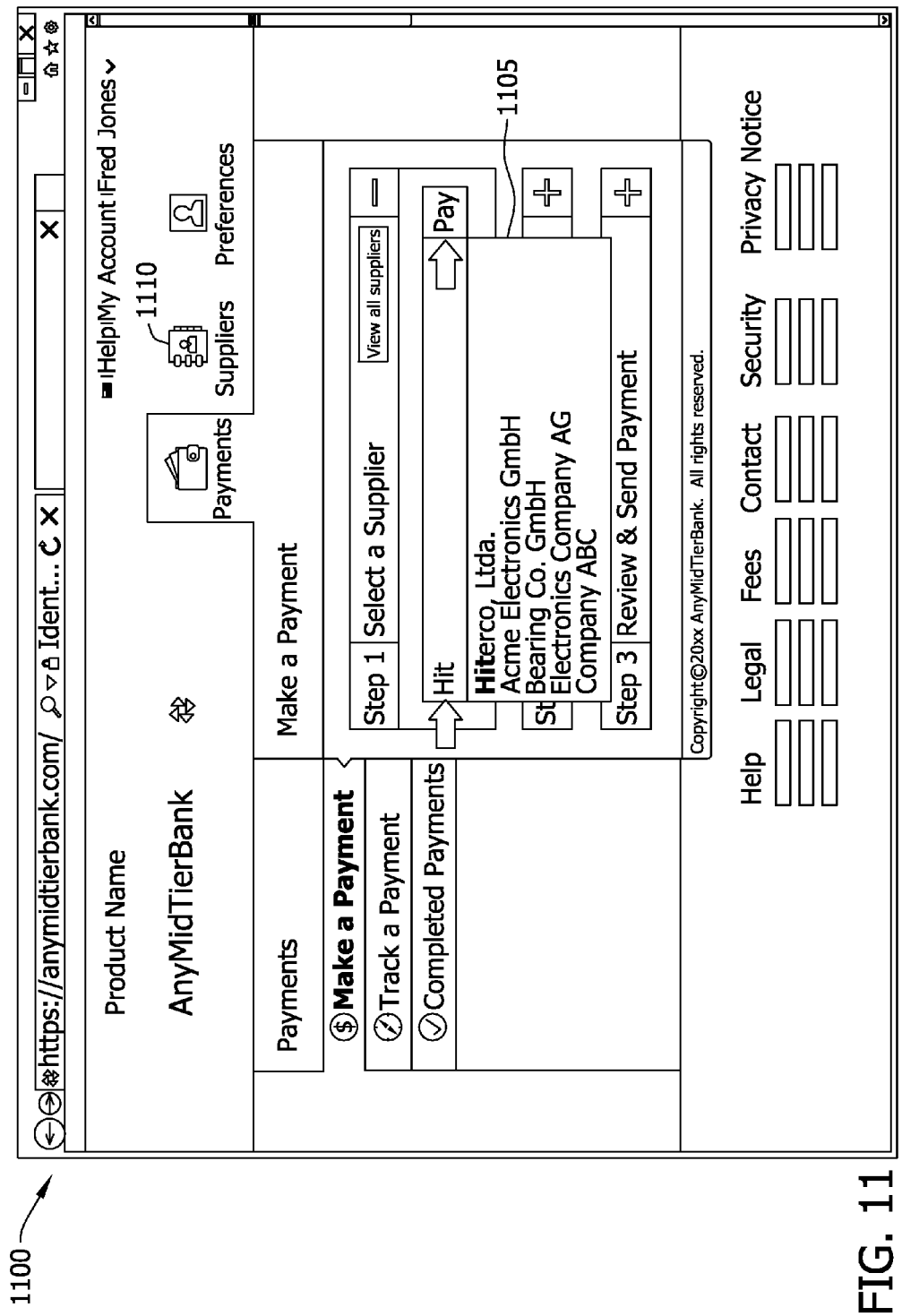
FIG. 11 is a schematic view of functions available to a payor for identifying a payee using the payment system shown in FIGS. 2A, 2B, and 3.

FIG. 11 illustrates a diagram 1100 of functions for identifying a payee. Diagram 1100 may be implemented as a webpage accessible via the Internet. In the exemplary embodiment, diagram 1100 shows a white-label interface (i.e., provided by a payor bank) for sending payments via a payment system, e.g., system 200. For example, a user, typically a payor, may identify the payee from a searchable list 1105. Searchable list 1105 may be a system-wide list available to all users. Alternatively, or additionally, searchable list 1105 may include payor-provided payees. More particularly, the payor may maintain a list of payees that is specific to the payor. Payee information input and management may be provided via a payee, or supplier, contact list 1110.

Figure 12:
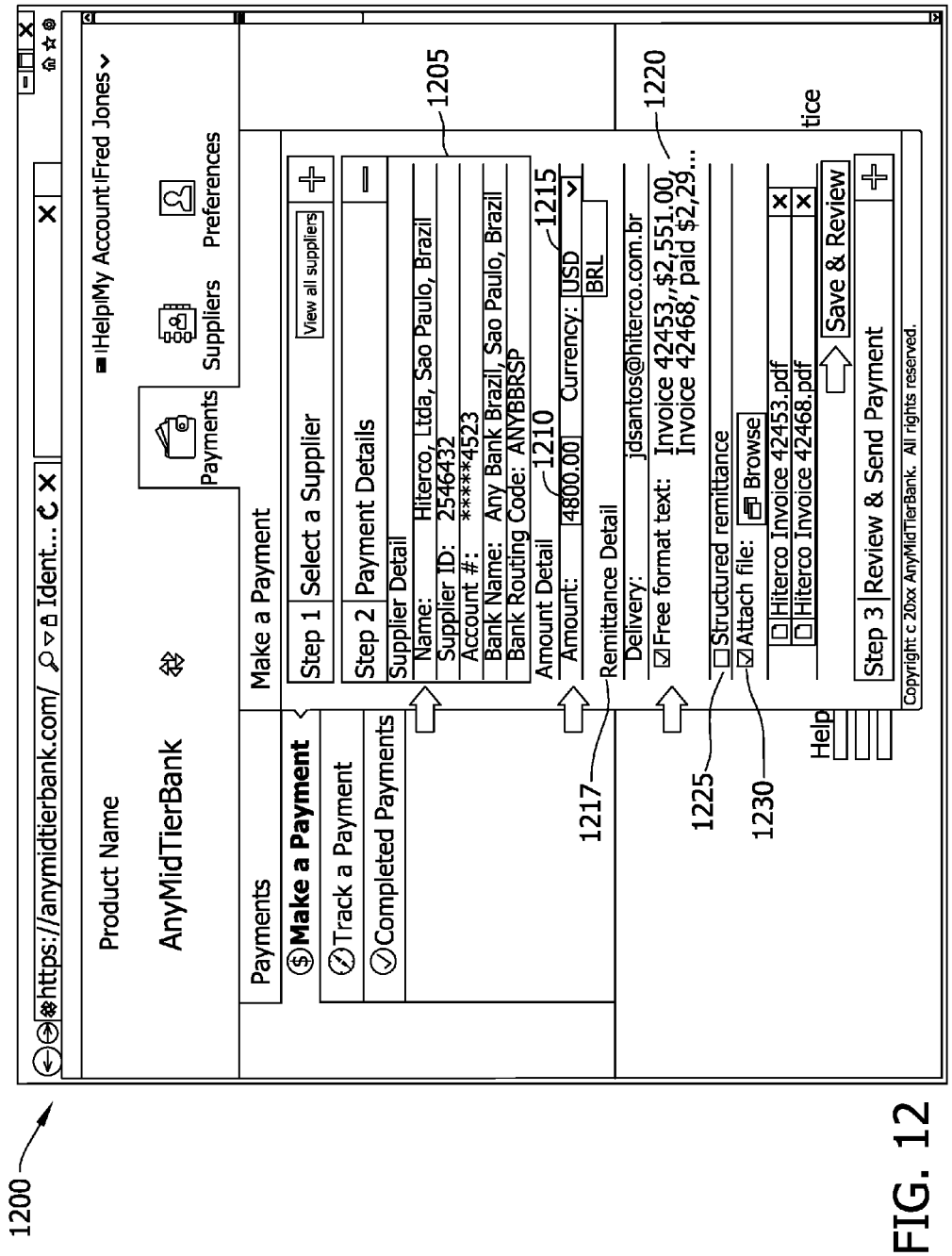
FIG. 12 is a schematic view of functions available for providing payment details using the payment system shown in FIGS. 2A, 2B, and 3.

FIG. 12 illustrates a diagram 1200 of functions for providing payment details. Diagram 1200 may be implemented as a webpage accessible via the Internet. Payee details 1205 that are associated with the payee identified by the payor may be shown. Payor identifies a payment amount 1210 and a currency 1215. Currency 1215 may be a pre-determined list that includes the currencies of the payor and the payee. Remittance data 1217, including free format text 1220, structured remittance data 1225, and/or attachments 1230 may be included with the payment details.

Figure 13:
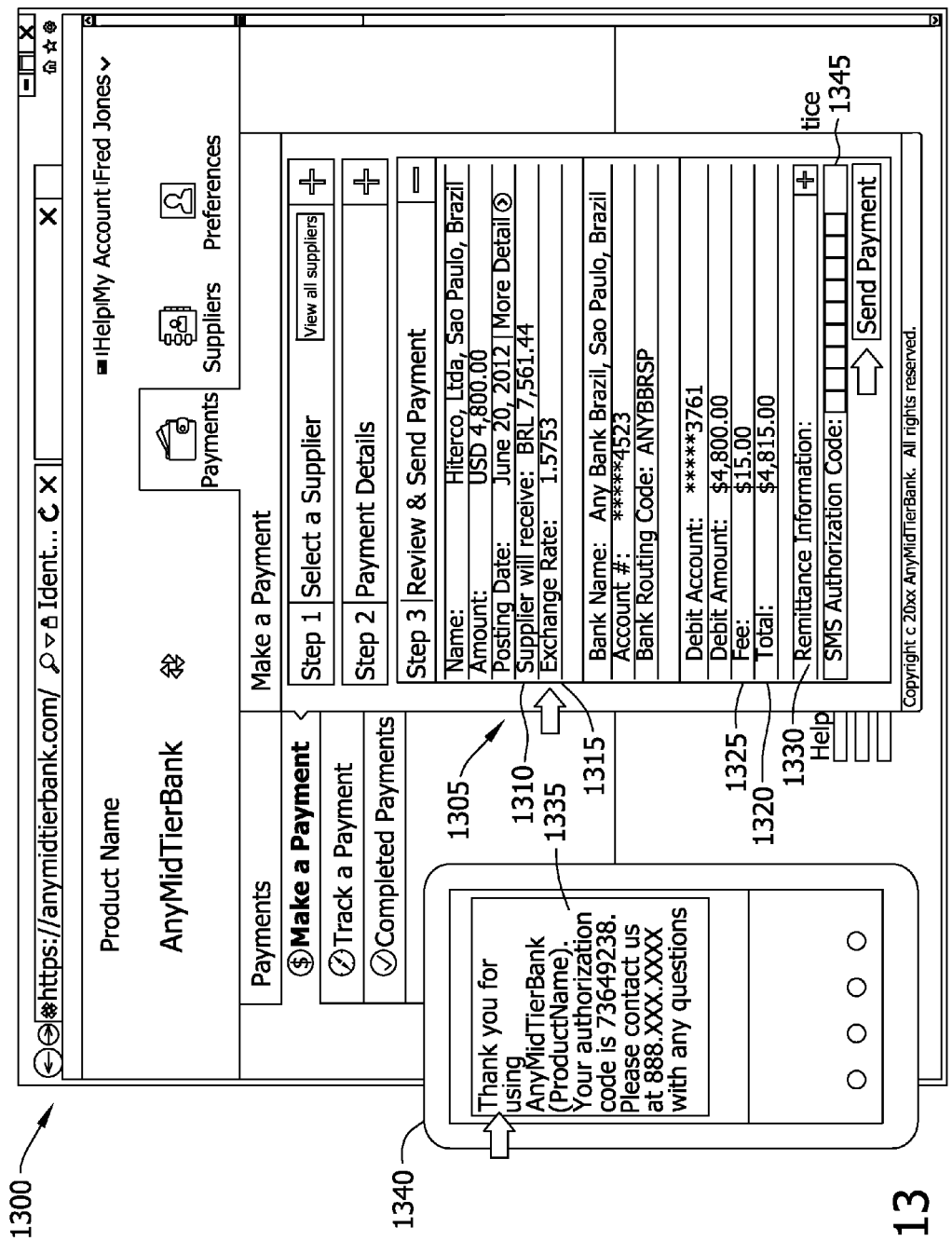
FIG. 13 is a schematic view of functions for reviewing and authenticating payments using the payment system shown in FIGS. 2A, 2B, and 3.

FIG. 13 illustrates a diagram 1300 of functions for reviewing and authenticating payments. Diagram 1300 may be implemented as a webpage accessible via the Internet. A summary 1305, including an amount 1310 a payee will receive, an exchange rate 1315, and a total 1320 including any fees 1325, may be displayed. Remittance information 1330 may be reviewed.

In one embodiment, an authorization code 1335 is sent, e.g., via SMS, to a mobile device 1340 that is associated with the payor. Authorization code 1335 must be input in an authorization code input area 1345 before the payment may be submitted.

Figure 14:
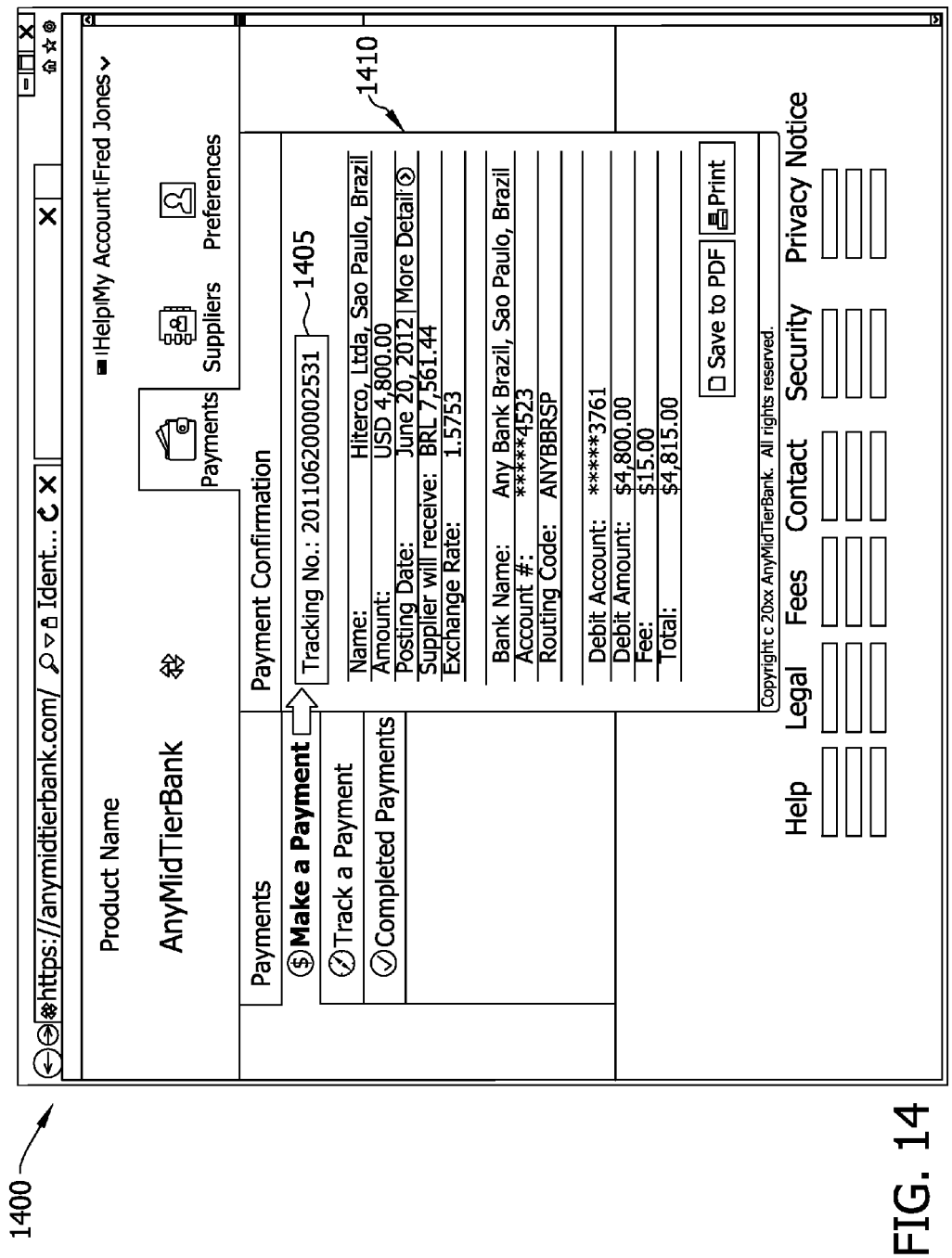
FIG. 14 is a schematic view of functions for confirming payment acceptance using the payment system shown in FIGS. 2A, 2B, and 3.

FIG. 14 illustrates a diagram 1400 of functions for confirming payment acceptance. Diagram 1400 may be implemented as a webpage accessible via the Internet. In the exemplary embodiment, a tracking number 1405 and a summary 1410 are provided. Tracking number 1405 may be used by payor to determine a current status of the payment.

Figure 15:
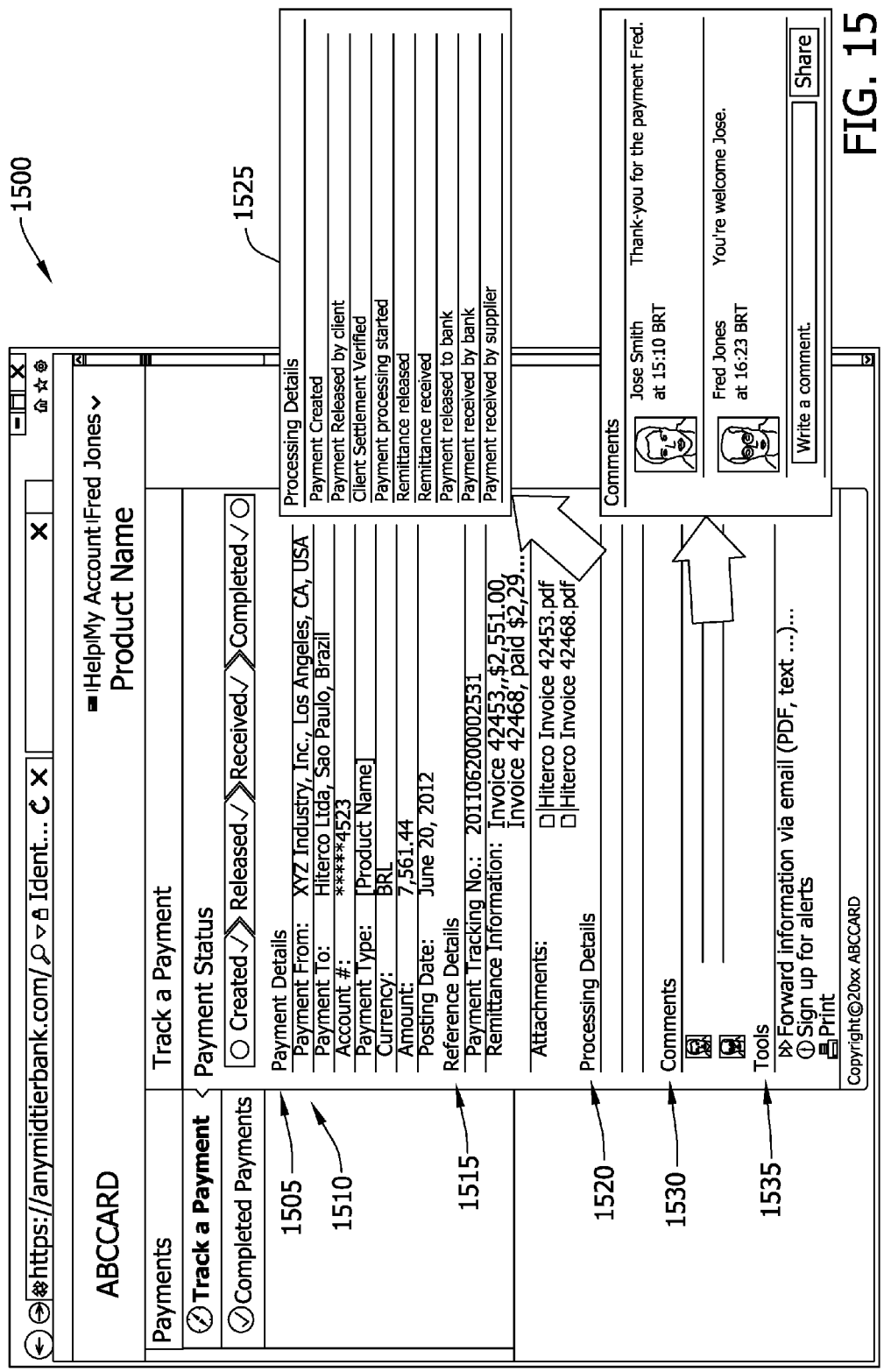
FIG. 15 is a schematic view of functions for tracking a payment using the payment system shown in FIGS. 2A, 2B, and 3.

FIG. 15 illustrates a diagram 1500 of functions for tracking a payment by a payor and/or a payee. Diagram 1500 may be implemented as a webpage accessible via the Internet. A payment status 1505, including payment details 1510, reference details 1515, and processing details 1520 may be provided. Processing details 1520 may include a time-stamped list of transactions and status updates for the payment. A non-exhaustive list 1525 of exemplary processing details 1520 is shown.

In the exemplary embodiment, diagram 1500 includes comments 1530 that may be exchanged between payor and payee. Comments 1530 may be securely exchanged in association with the payment. Tools 1535 enable a user to send payment information via email or some other means, and to receive alerts, e.g., by email upon the occurrence of pre-determined processing events such as those in list 1525.

The systems and processes described herein enable payment system 212 to facilitate cross border payments using a payment network. By using the payment network, predictability is added to fees and costs, particularly foreign exchange rates, transactions are simplified and accelerated in contrast to existing systems, and detailed remittance data is provided to billers/payees. More particularly, by using the payment network, money can be transferred without the use of intermediary banks. As intermediary banks may impose fees (for transactions, currency exchange, etc.), sometimes without prior notice to the payor, intermediary banks add additional cost and uncertainty to cross-border payments in conventional systems. Accordingly, by eliminating the need for intermediary banks, the systems and processes described herein add predictability to the timing of the payment, the availability of necessary data, and fees.

The systems and processes are not limited to the specific embodiments described herein. In addition, components of each system and each process can be practiced independent and separate from other components and processes described herein. Each component and process also can be used in combination with other assembly packages and processes.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense. For example, the payor may be a consumer or a business entity and/or the payee may be an individual or a business entity. Thus, while business-to-business transactions are used as an example throughout, it is contemplated that personal and/or non-business transactions may be executed according to the embodiments described herein.

A computer device, such as those described herein, includes at least one processor or processing unit and a system memory. The computer device typically has at least some form of computer readable media. By way of example and not limitation, computer readable media include computer storage media and communication media. Computer storage media include volatile and nonvolatile, removable and non-removable physical media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The methods described herein may be encoded as executable instructions embodied in a computer readable medium, including, without limitation, a computer storage medium, a storage device, and/or a memory device. Such instructions, when executed by a processor, cause the processor to perform at least a portion of the methods described herein.

Although the present invention is described in connection with an exemplary bill payment processing system environment, embodiments of the invention are operational with numerous other general purpose or special purpose financial transaction/bill payment processing system environments or configurations. The bill payment processing system environment is not intended to suggest any limitation as to the scope of use or functionality of any aspect of the invention. Moreover, the bill payment processing system environment should not be interpreted as having any dependency or requirement relating to any one or combination of components illustrated in the exemplary operating environment. Examples of well-known bill payment processing systems, environments, and/or configurations that may be suitable for use with the embodiments described herein include, but are not limited to, embedded computer devices, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program components or modules, executed by one or more computers, processors, and/or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal languages of the claims.

While the invention has been described in terms of various specific embodiments, those skilled in the art will recognize that the invention can be practiced with modification within the spirit and scope of the claims.

The invention claimed is:

1. A computer system for processing electronic cross-border payments, said computer system comprising a memory device and a processor, said computer system coupled to a payment network, said computer system programmed to:
  receive an identification of a payee from a payor, the payee having a payee bank account, the payor having a payor bank account, the payor making a cross-border payment to the payee;
  receive, from the payor, a destination currency and a destination payment amount in the destination currency, the destination payment amount representing the cross-border payment being made by the payor;
  determine an exchange rate based on the destination currency and an origination currency, wherein the origination currency is based on the payor bank account;
  determine an origination payment amount in the origination currency based on the destination payment amount in the destination currency and the exchange rate;
  determine a transaction cost in the origination currency;
  determine a total transaction amount in the origination currency that includes the origination payment amount and the transaction cost;
  settle the cross-border payment directly between the payor bank and the payee bank, wherein the settlement of the cross-border payment includes (i) debiting a settlement account of the payor bank for the total transaction amount in the origination currency, and (ii) crediting a settlement account of the payee bank with the destination payment amount in the destination currency; and
  provide a transaction status indicating a status of the cross-border payment from the payor bank to the payee bank.

2. A system in accordance with claim 1, wherein said computer system is further programmed to enroll a payee in a directory of payees.

3. A system in accordance with claim 2, wherein receiving an identification of a payee includes receiving an identification of a payee from the directory of payees.

4. A system in accordance with claim 1, wherein said computer system is further programmed to receive remittance information from a payor, the remittance information including data identifying an invoice associated with the cross-border payment.

5. A system in accordance with claim 4, wherein said computer system is further programmed to send the received remittance information to the payee.

6. A system in accordance with claim 1, wherein said computer system is further programmed to determine a total transaction cost and transmit the total transaction cost to a remote computer for displaying prior to completing the cross-border payment, wherein the remote computer is associated with the payor such that the payor is advised of the total transaction cost before finalizing the cross-border payment.

7. A system in accordance with claim 1, wherein the settlement of the cross-border payment is performed without involving any other intermediary financial institution.

8. A computer-based method for processing electronic cross-border payments using a computer device coupled to a payment network, said method comprising:
    receiving an identification of a payee from a payor, the payee having a payee bank account, the payor having a payor bank account, the payor making a cross-border payment to the payee;
    receiving, from the payor, a destination currency and a destination payment amount in the destination currency, the destination payment amount representing the cross-border payment being made by the payor;
    determining, using the computer device, an exchange rate based on the destination currency and an origination currency, wherein the origination currency is based on the payor bank account;
    determining an origination payment amount in the origination currency based on the destination payment amount in the destination currency and the exchange rate;
    determining a transaction cost in the origination currency;
    determining, using the computer device, a total transaction amount in the origination currency that includes the origination payment amount and the transaction cost;
    settling the cross-border payment directly between the payor bank and the payee bank, wherein the settlement of the cross-border payment includes (i) debiting a settlement account of the payor bank for the total transaction amount in the origination currency, and (ii) crediting a settlement account of the payee bank with the destination payment amount in the destination currency; and
    providing a transaction status indicating a status of the cross-border payment from the payor bank to the payee bank.

9. A method in accordance with claim 8, further comprising enrolling a payee in a directory of payees.

10. A method in accordance with claim 9, wherein receiving an identification of a payee includes receiving an identification of a payee from the directory of payees.

11. A method in accordance with claim 8, further comprising receiving remittance information from a payor, the remittance information including data identifying an invoice associated with the payment.

12. A method in accordance with claim 11, further comprising sending the received remittance information to the payee.

13. A method in accordance with claim 8, further comprising determining a total transaction cost and transmitting the total transaction cost to a remote computer for displaying prior to completing the cross-border payment, wherein the remote computer is associated with the payor such that the payor is advised of the total transaction cost before finalizing the cross-border payment.

14. A method in accordance with claim 8, wherein the settlement of the cross-border payment is performed without involving any other intermediary financial institution.

15. At least one non-transitory computer-readable storage media having computer-executable instructions embodied thereon, wherein when executed by at least one processor, the computer-executable instructions cause the processor to:
    receive an identification of a payee from a payor, the payee having a payee bank account, the payor having a payor bank account, the payor making a cross-border payment to the payee;
    receive, from the payor, a destination currency and a destination payment amount in the destination currency, the destination payment amount representing the cross-border payment being made by the payor;
    determine an exchange rate based on the destination currency and an origination currency, wherein the origination currency is based on the payor bank account;
    determine an origination payment amount in the origination currency based on the destination payment amount in the destination currency and the exchange rate;
    determine a transaction cost in the origination currency;
    determine a total transaction amount in the origination currency that includes the origination payment amount and the transaction cost;
    settle the cross-border payment directly between the payor bank and the payee bank, wherein the settlement of the cross-border payment includes (i) debiting a settlement account of the payor bank for the total transaction amount in the origination currency, and (ii) crediting a settlement account of the payee bank with the destination payment amount in the destination currency; and
    provide a transaction status indicating a status of the cross-border payment from the payor bank to the payee bank.

16. The computer-readable storage media of claim 15, wherein the computer-executable instructions further cause the processor to receive remittance information from a payor, the remittance information including data identifying an invoice associated with the cross-border payment.

17. The computer-readable storage media of claim 16, wherein the computer-executable instructions further cause the processor to send the received remittance information to the payee.

18. The computer-readable storage media of claim 15, wherein the settlement of the cross-border payment is performed without involving any other intermediary financial institution.

19. A computer system for processing electronic cross-border payments, said computer system comprising a memory and a processor, said computer system coupled to a payment network, said computer system programmed to:
    receive an identification of a payee from a payor, the payee having a payee bank account, the payor having a payor bank account, the payor making a cross-border payment to the payee;
    receive, from the payor, one of (i) a destination currency and a destination payment amount in the destination currency, and (ii) an origination currency, an origination payment amount in the origination currency, and a destination currency, wherein the payment amount represents the cross-border payment being made by the payor and wherein the origination currency is based at least in part on the payor bank account;

determine an exchange rate based on the destination currency and the origination currency;

determine the other of (i) the origination payment amount in the origination currency based at least in part on the exchange rate, and (ii) the destination payment amount in the destination currency based at least in part on the exchange rate;

determine a transaction cost in the origination currency;

determine a total transaction amount in the origination currency that includes the origination payment amount and the transaction cost;

settle the cross-border payment directly between the payor bank and the payee bank, wherein the settlement of the cross-border payment includes (i) debiting a settlement account of the payor bank for the total transaction amount in the origination currency, and (ii) crediting a settlement account of the payee bank with the destination payment amount in the destination currency; and provide a transaction status indicating a status of the cross-border payment from the payor bank to the payee bank.

* * * * *